United States Patent
Zeiger et al.

(10) Patent No.: US 7,338,193 B1
(45) Date of Patent: Mar. 4, 2008

(54) LIGHT TRANSFER DEVICE FOR AN ELECTRONIC DEVICE

(75) Inventors: David R. Zeiger, Mundelein, IL (US); Rachid M. Alameh, Crystal Lake, IL (US); Maninder S. Sehmbey, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/622,080

(22) Filed: Jan. 11, 2007

(51) Int. Cl.
*F21V 8/00* (2006.01)

(52) U.S. Cl. ............... 362/551; 362/602; 362/555; 362/558; 385/146; 455/575.3; 379/433.13

(58) Field of Classification Search ............ 362/602, 362/615, 551, 555, 558, 559, 560, 561; 385/146; 455/575.3; 379/433.13, 433.11; 340/815.42
See application file for complete search history.

(56) References Cited

U.S. PATENT DOCUMENTS 5,889,602 A * 3/1999 Johnson et al. ............ 398/131

2003/0087610 A1    5/2003  Ono
2004/0223689 A1 * 11/2004  Lempkowski et al. ........ 385/26

FOREIGN PATENT DOCUMENTS

GB         2406987 A1    4/2005

* cited by examiner

*Primary Examiner*—Laura Tso

(57) ABSTRACT

An electronic device includes a housing having pivotal portions and having a hinge defining a hinge axis between the pivotal portions about which the pivotal portions are pivotal. A light source is associated with one of the pivotal portions and a light receiver is associated with the other pivotal portion. A first substantially rigid light pipe is mounted to the one pivotal portion and is configured to receive light from the light source and direct light therefrom along the hinge axis. A second substantially rigid light pipe is mounted to the other pivotal portion and configured to receive light from the first light pipe along the hinge axis and direct light therefrom to the light receiver.

19 Claims, 7 Drawing Sheets

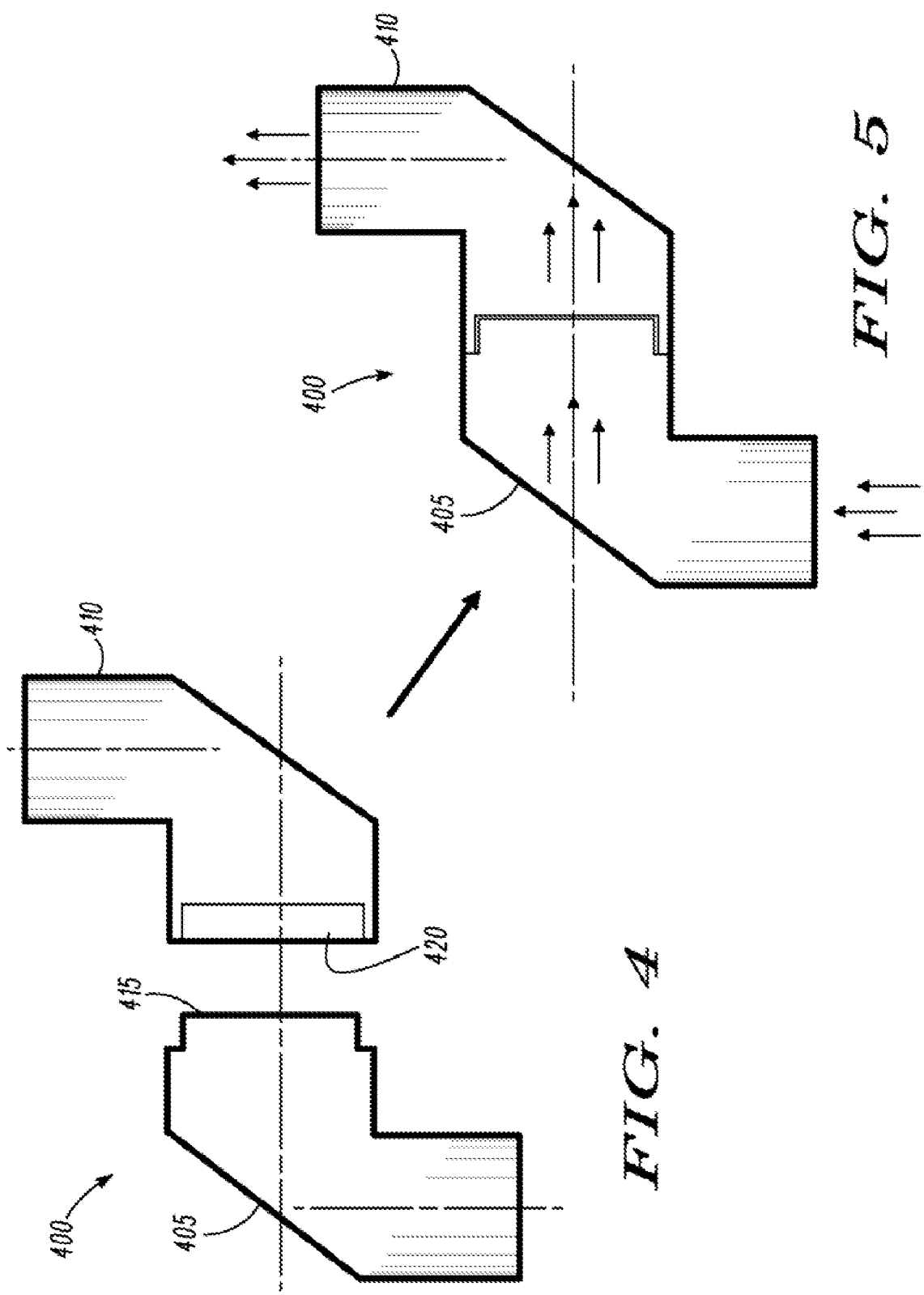

LIGHT TRANSFER DEVICE FOR AN ELECTRONIC DEVICE

TECHNICAL FIELD

This invention relates generally to a light transfer apparatus having interfacing light pipes for an electronic device having pivotal portions.

BACKGROUND

Many cell phones are designed in a way that conserves space, making it easier for a user to carry. Some of the cell phones are designed as two rotatably connected housings that rotate or pivot open and then closed. These cell phones are known as "clamshell phones" or "rotator phones" depending on the orientation of the hinge to the housing halves. A clamshell phone typically includes a base portion, a rotatable portion, and a hinge to pivotally connect the base portion and the rotatable portion. When not in use, the rotatable portion usually lays flush against the base portion. In the event that the user desires to utilize the phone to make a phone call, send a text message, or view information stored in a memory of the phone, the user can open the phone by rotating the rotatable portion open. When a user opens the phone, the rotatable portion angularly rotates or pivots with respect to the hinge.

Clamshell phones often include a display and other elements, such as a camera lens, affixed to the rotatable portion. The base portion typically includes a processor that controls many elements of the clamshell phone, including elements located in the base portion as well as elements located in the rotatable portion. Due to the presence of the processor in the base portion and the need for various electronic components of the base portion needing to communicate with various electronic components in the rotatable portion, a communication path is required between the base portion and the rotatable portion.

There have been proposals of clamshell phones in the art that utilize fiber optic cables to transmit light signals from the base portion to the rotatable portion. The use of fiber optic cables, however, can be very expensive and the fiber optic cables can wear down and lose fidelity after substantial repeated opening and closing of the respective rotatable phones and portable notebook computers. Such fiber optical cables also cannot be molded into various shapes for ease of use within such rotatable phones and portable notebook computers.

Traditionally, copper wiring has been used as the communication path. When copper wiring is used, there is often a need for 50-60 copper wire lines between the rotatable portion and the base portion. These copper wire lines have been placed in a multi-layer (e.g., four or five layers are often used) flexible circuit extending between the base portion and the rotatable portion. The layers may be formed of a flexible plastic material in which the copper lines are mounted. The use of copper wiring is, however, problematic. For example, the use of the copper wiring can result in electromagnetic ("EM") radiation that affects the transmission across adjacent copper wires. The EM radiation results in noise that can adversely affect data transmission.

Some systems have reduced the number of lines by serializing the lines, resulting in fewer but higher speed lines. When the lines are serialized, multiple lines of data can be transmitted across a single line at different times. For example, the data for the first line may be transmitted, followed by the data for the second line, and then data for the third line, across a single copper line. A serialization embodiment is also subject to the same EM radiation problems that occur without serialization and could interfere more with cellular bands because the higher speed serialized signal is closer to the cellular band.

Another problem with using flexible circuits is their inherent unreliability. Specifically, the flexible circuits require use of many connectors that can lose their fidelity over time and use. Furthermore, flex copper lines can break down over extended use following many hundreds of rotational open/close bending. The physical connections required in current systems in the art are therefore problematic Optical communication following the process of serialization provides a viable solution to such problems. Serialization minimizes the number of data lines (e.g., possibly down to one data line) at the expense of higher speed. This makes the use of optical communication very practical due to the limited data lines (one transceiver is needed). Furthermore, low cost optical diodes (e.g., Vertical Cavity Surface Emitting Lasers ("VCSELs")) are readily available today and very capable of high speeds in the GHz range.

An additional problem with current clamshell phones is the requirement of circuitry to detect when the phone is in the open position or whether it is closed so that the phone knows whether to power the display or other circuitry in the rotatable portion and/or in the base portion.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 4 and 5 illustrate an enlarged diagrammatic view of the light pipes where one of the light pipes includes a first radially extending member on one end having a larger diameter than a second radially extending member of a facing end of the other light pipe, for providing a mating configuration between the light pipes along the hinge axis;

Figure 1:
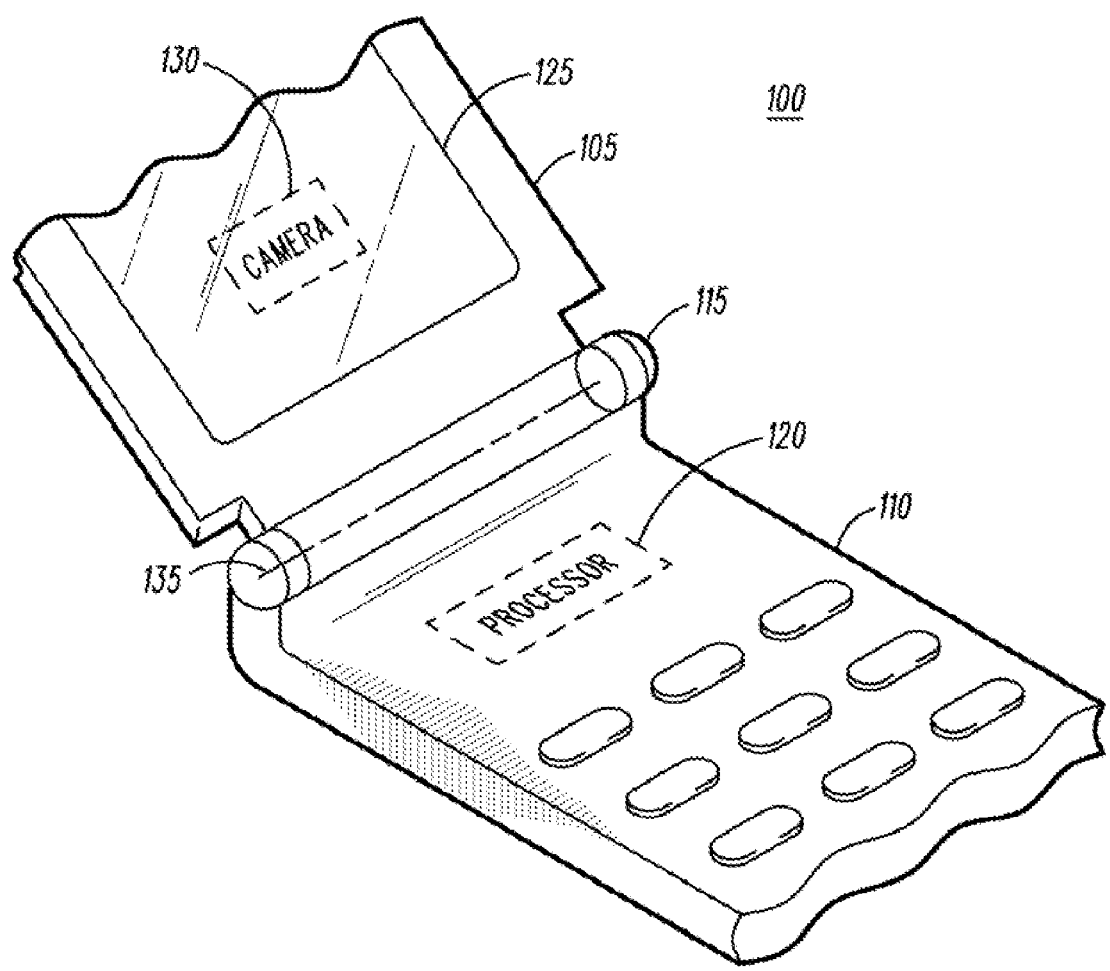
FIG. 1 is a perspective view of a clamshell phone in accordance with one form of the invention showing pivotal rotatable and base portions thereof with a hinge therebetween.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

According to various embodiments described below, an electronic device, such as a wireless communication device, is provided having a housing for containing circuitry, such as a laser diode or other light source, for generating a light beam. The housing has pivotal portions and a hinge defining a hinge axis between the pivotal portions about which the pivotal portions are pivotal. The light source is associated with one of the pivotal portions and a light receiver is associated with the other pivotal portion. A first substantially rigid light pipe is mounted to the one pivotal portion and configured to receive light from the light source and direct light therefrom along the hinge axis. A second substantially rigid light pipe is mounted to the other pivotal portion and configured to receive light from the first light pipe along the hinge axis and direct light therefrom to the light receiver. The light is utilized for optically transmitting data between various electronic circuitry within the pivotal portions. In one form, the light pipes are of a molded light transmissive material. Each light pipe includes an end aligned along the hinge axis and an opposite end aligned in a direction transverse to the hinge axis.

The first light pipe may receive light from the light source disposed within one of the pivotal portions. The light flows through the first light pipe and reflects off a reflective surface or material within the first light pipe and exits through an end of the first light pipe aligned along the hinge axis. The light is received by an end of the second light pipe that is also aligned or oriented along the hinge axis. The light is subsequently reflected off a reflective surface or material within the second light pipe and exits through the other end of the second light pipe that is transverse to the hinge axis. The light is received by a light sensor within the other pivotal portion.

In one example, the wireless communication device or other electronic device is a wireless clamshell phone having a rotatable portion and a base portion, and a light redirecting mechanism comprising light pipes is utilized to redirect light from the rotatable portion to the base portion and/or from the base portion to the rotatable portion. In one form, the light is infrared light and the light redirecting mechanism is located along the hinge axis of the clamshell phone. A light source, such as a laser diode, is located on the pivotal phone portion housing transmitting the light, and a light sensor, such as a photodetector or photodiode, is located on the other pivotal phone housing receiving the light. The light is utilized to optically transmit data and other information in an efficient and reliable manner between the base portion and rotatable portion without having to utilize problematic fiber optic cables or flexible circuits, for instance.

In an embodiment where the light is traveling from the base portion to the rotatable portion, the light source may be located in the base portion at a location transverse to the hinge axis. The light source transmits light toward an end of a light pipe facing the light source and that is also transverse to the hinge axis.

The light pipes are aligned along the hinge axis and configured to maintain an optical alignment therebetween in the event that the electronic device is pivoted between open and closed positions. During the opening/closing of the electronic device, the ends of the light pipes that lay along the hinge axis pivot relative to each other while maintaining this proper optical alignment, thereby providing an efficient and reliable means for the optical transmission of data between electronic components within the pivotal portions. The use of such light pipes avoids the high cost associated with fiber optics and the EM problems of current clamshell phones and provides for rapid optical data transfer.

The embodiments described below are directed toward use of a clamshell phone. However, it should be appreciated that these teachings are also applicable to other electronic devices utilizing pivotal portions where optical data is transferred between the pivotal portions, such as a portable notebook computer. Moreover, in some embodiments, a single set of light pipes is used to provide a bi-directional light path. For example, a first light beam may travel from the base portion to the rotatable portion via the center of the light pipes, whereas a second light beam may travel from the rotatable portion to the base portion via the outer walls of the light pipes.

FIG. 1 is a perspective view of a clamshell phone 100 in accordance with one form of the invention showing pivotal rotatable and base portions thereof with a hinge therebetween. The clamshell phone 100 includes a rotatable portion 105 and a base portion 110. The rotatable portion 105 is coupled to the base portion 110 via a hinge 115. The base portion 110 may include various electronic components, including a processor 120. The rotatable portion 105 may include electronic components of its own, such as a display 125 and a camera 130. The camera 130 is shown with dashed lines to indicate that is located on the side of the rotatable portion 105 opposite from the side on which the display 125 is shown.

A user may manually pivot the clamshell phone 100 between an "open" position and a "closed" position. In the closed position, the rotatable portion 105 lies on top of the base portion 110. In the open position, the rotatable portion 105 extends away from the base portion 110. The rotatable portion 105 and the base portion 110 pivot about a hinge axis 135 of the hinge 115.

The rotatable portion 105 of the clamshell phone 100 includes various circuitry and electronic elements that need to communicate with other circuitry or electronic elements in the base portion 110. For example, as discussed above, the rotatable portion 105 may include a display 125 and a camera 130, whereas the base portion 110 includes a processor 120. For simplicity of design, some clamshell phones 100 include only a single processor that controls electronic elements in the rotatable portion, such as the display 125 and the camera 130.

To facilitate communication of data and other information between the rotatable portion 105 and the base portion 110, the clamshell phone 100 includes a light transfer apparatus having two light pipes that interface with each other and are utilized to facilitate the transfer of optical data and other information between the base portion 110 and the rotatable portion 105.

Figure 2:
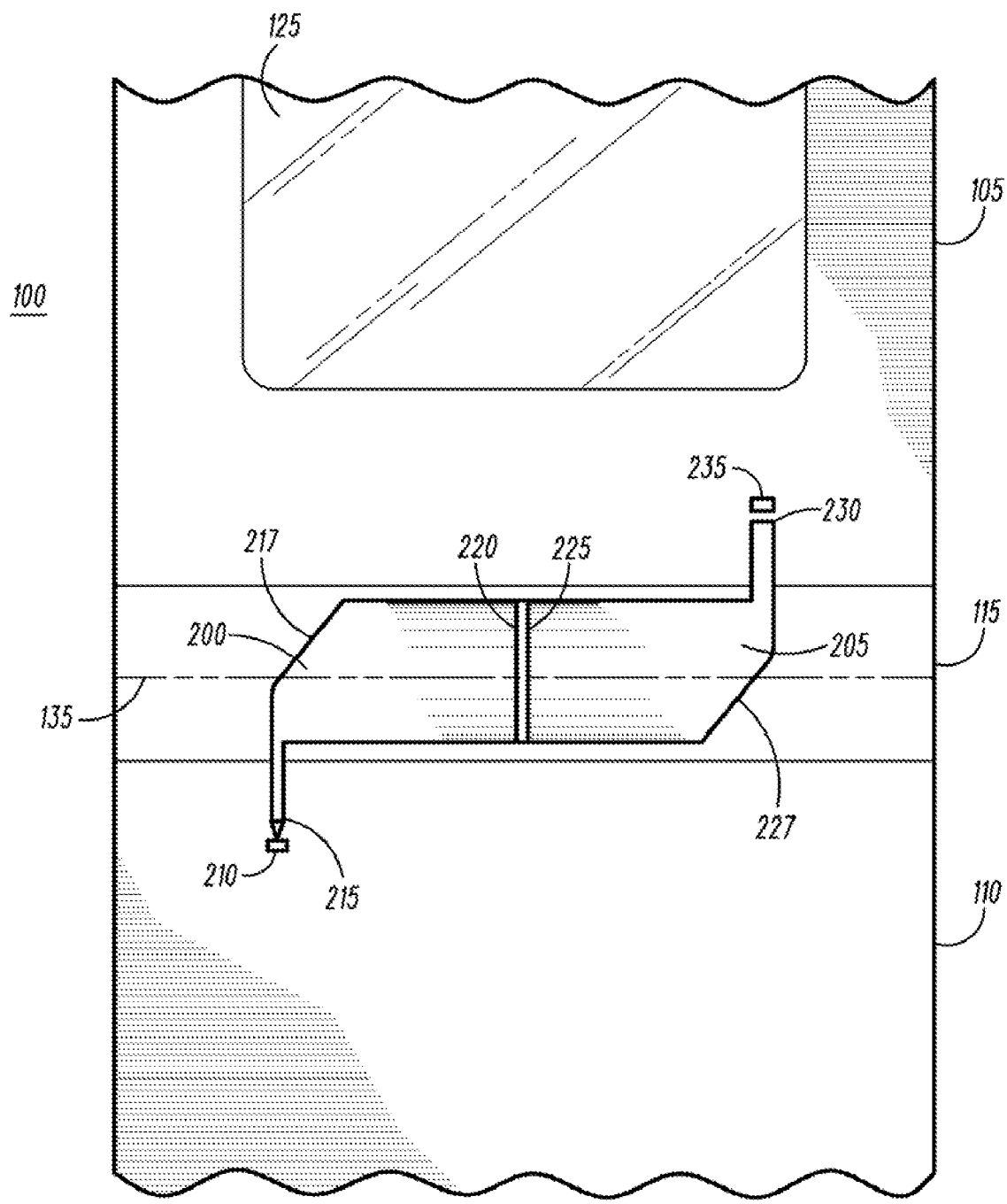
FIG. 2 is an enlarged, fragmentary perspective view of the hinge showing a light transfer apparatus including two light pipes oriented along the hinge axis with the rotatable portion pivoted open relative to the base portion.

FIG. 2 is an enlarged, fragmentary perspective view of the hinge 115 showing a light transfer apparatus including two light pipes oriented along the hinge axis 135 with the rotatable portion 105 pivoted open relative to the base portion 110. As shown, the clamshell phone 100 includes a first substantially rigid light pipe 200 and a second substantially rigid light pipe 205 disposed within the hinge 115 of the clamshell phone 100. Although referred to herein as a hinge 115, the hinge 115 may also be known as a "knuckle."

A light source 210 is disposed in the base portion 110 of the clamshell phone 100. The light source 210 generates a light beam, such as an infrared light beam, that is received by a first end 215 of the first light pipe 200 that substantially extends in a direction transverse to the hinge axis. The light beam travels up into the first light pipe 200 and reflects off a reflective surface 217. The reflective surface 217 may be configured or aligned to lay at a 45 degree angle to the first end of the first light pipe 200 such that in the event that the first light beam is traveling perpendicular to the hinge axis, the reflected light beam will be parallel to the hinge axis. Other angles may alternatively be utilized, and all are generally designed to reflect the light beam in a direction parallel to the hinge axis, substantially along the hinge axis. After reflecting off the reflective surface 217, the light beam travels down a section of the first light pipe that is parallel to the hinge axis 135 and exits via a second end 220 in the same general direction along the hinge axis. The second end 220 is disposed within the hinge 115 and directly faces a first end 225 of the second light pipe 205.

After the light beam exits the second end 220 of the first light pipe 200, it travels into the second light pipe 205 via the first end 225 that faces the second end 220 of the first light pipe 200 and is substantially in alignment with the hinge axis. The light beam travels through the second light pipe 205 and reflects off a second reflective surface 227. As with the reflective surface 217 of the first light pipe 200, the second reflective surface 227 is aligned at an angle to the hinge axis and a second end 230 of the second light pipe 205. In one example, the second reflective surface 227 may be aligned at a 45 degree angle to the hinge axis such that when a light beam parallel to the hinge axis 135 reflects off it, the reflected beam travels in a direction perpendicular to the hinge axis. As with the reflective surface 217 of the first light pipe 200, it should be appreciated that the 45 degree angle discussed above is one example, and other suitable configurations may be utilized, depending on the particular embodiment.

A light sensor 235 may be disposed within the rotatable portion 105 such that the light beam exiting the second end 230 of the second light pipe 205 is received by the light sensor 235. It should be appreciated that although the light path is shown only from the base portion 110 to the rotatable portion 105, the opposite optical path, i.e., from the rotatable portion 105 to the base portion 110, is also available. To transmit a light beam in the opposite direction, a second light source may be disposed adjacent to the light sensing element 235 in the rotatable portion 105, and a second light sensing element may be disposed adjacent to the light source 210 in the base portion 110. The optical data may be transmitted bi-directionally. For example, the light may travel from the base portion 110 to the rotatable portion, and then a different light beam may travel from the rotatable portion 105 to the base portion 110. The light beams may be operated to intermittently transmit various light beams between the base portion 110 and the rotatable portion 105.

The first light pipe 200 is in a fixed position relative to the base portion 110 and the second light pipe 205 is in a fixed position relative to the rotatable portion 105. When the clamshell phone 100 is opened and/or closed, optical data may continue to be transferred between the rotatable portion 105 and the base portion 110. This is possible because during such opening or closing, the second end 220 of the first light pipe 200 and the first end 225 of the second light pipe 205 pivot relative to each other while maintaining an optical alignment. The second end 220 of the first light pipe 200 and the first end 225 of the second light pipe 205 may each have a substantially cylindrical shape with the same dimensions such that as first light pipe 200 and the second light pipe 205 pivot relative to each other, the proper alignment is maintained so that light continues to pass between the second end 220 of the first light pipe 200 and the first end 225 of the second light pipe 205.

The first light pipe 200 and the second light pipe 205 are shown as having some bent sections or angles within them. In other words, neither forms a straight path between their respective first end and second end. To ensure that the light beam travels through the first light pipe 200 and the second light pipe 205, the light pipes include reflective surfaces, such as mirrors, disposed therein. Use of such mirrored surfaces increases light transfer efficiency in the event that the first light pipe 200 and the second light pipe 205 are misaligned within the hinge 115. The first light pipe 200 and the second light pipe 205 may be formed of a molded material such as acrylic, glass, or Lexan™.

Figure 3:
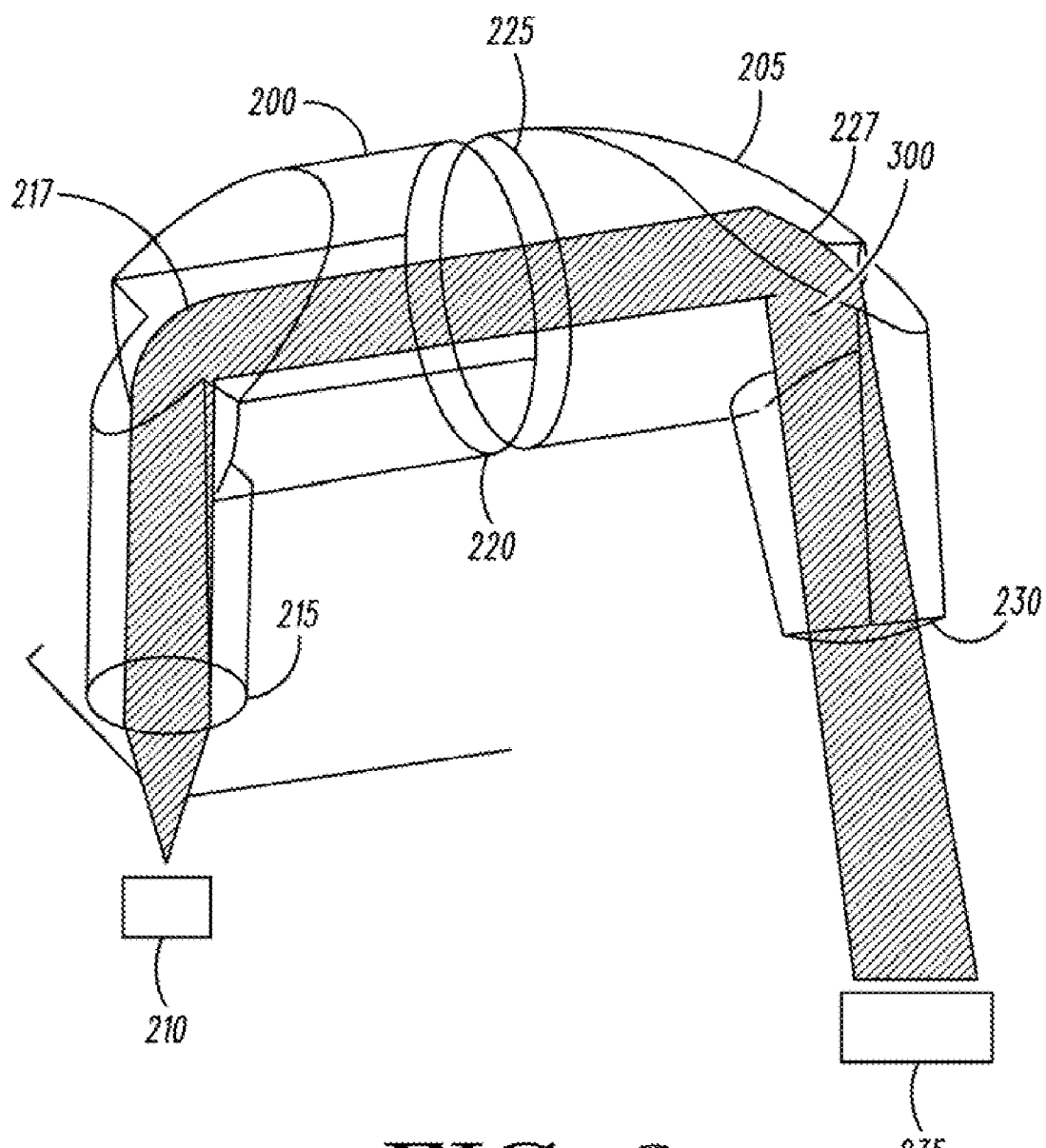
FIG. 3 is an enlarged diagrammatic view of the light pipes and the light path from a light source through the light pipes to a sensor.

FIG. 3 is an enlarged diagrammatic view of the light pipes and the light path from a light source through the light pipes to a sensor. As discussed above, the light source 210 generates a light beam that is received by a first end 215 of the first light pipe 200. In this example, the first end 215 of the first light pipe 200 extends in a direction transverse to the hinge axis. A focusing lens (not shown) may be disposed between the light source 210 and the first end 215 to ensure that the light beam is properly focused on the first end 215. FIG. 3 illustrates the optical path 300 of the light beam. As illustrated, the light beam flows from the first end 215 of the first light pipe 200 and reflects off a reflective surface 217. The reflected light beam travels in a direction generally aligned with the hinge axis to the second end 220 of the first light pipe 200. The light beam flows out of the first light pipe 200 and through the first end 225 of the second light pipe 205. The light beam reflects off a second reflective surface 227 and down through the second end 230 of the second light pipe 205 that is transverse to the hinge axis. The light flows out of the second end 230 and is received by the light sensing element or sensor 235. Another focusing lens (not shown) may be disposed between the second end 230 and the light sensing element 235 to ensure that the light beam is properly focused on the light sensing element 235. With proper alignment between the first light pipe 200 and the second light pipe 205, there is only a very small loss of emitted light seen through a full pivoting movement of the first light pipe 200 relative to the second light pipe 205.

FIGS. 4 and 5 illustrate an enlarged diagrammatic view a light transfer apparatus 400 of the light pipes where one of the light pipes includes a first radially extending member on one end having a larger diameter than a second radially extending member of a facing end of the other light pipe, for providing a mating configuration between the light pipes along the hinge axis. A first light pipe 405 and a second light pipe 410 are shown. The first light pipe 405 includes a radially extending member 415 or annular flange that mates with a reduced diameter member 420 of the second light pipe 410. The radially extending member 415 and the reduced diameter member are configured such that these elements mate with each other to provide proper alignment of the light pipes along the hinge axis when inserted into a clamshell phone such as the one shown in FIGS. 1 and 2. In other words, the radially extending member 415 effectively locks into the reduced diameter member 420 like a plug and socket configuration to ensure proper alignment between the first light pipe 405 and the second light pipe 410, as shown in FIG. 5.

When mated, the first light pipe 405 has the ability to pivot relative to the second light pipe 410 around the area at which the mating occurs. By mating the first light pipe 405 and the second light pipe 410, misalignment losses are alleviated.

Figure 6:
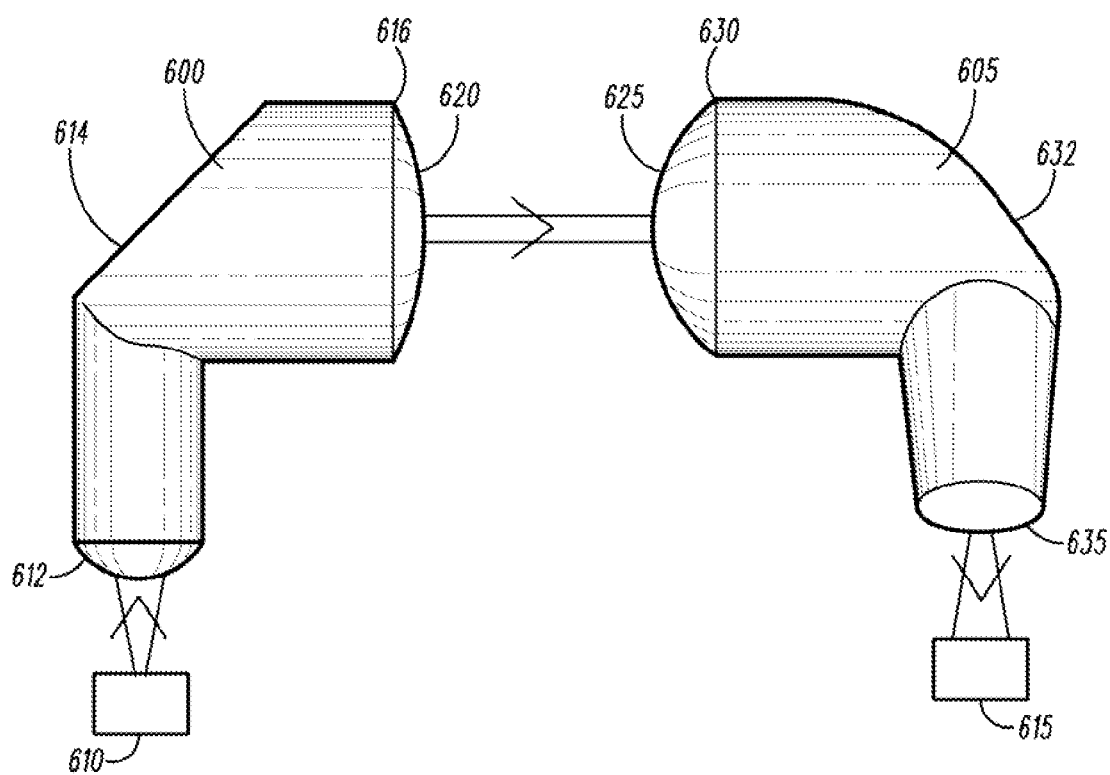
FIG. 6 illustrates an enlarged diagrammatic view of the light pipes having lens on the ends facing each other along the hinge axis.

FIG. 6 illustrates an enlarged diagrammatic view of the light pipes having lens on the ends facing each other along the hinge axis. As shown, a first light pipe 600 is disposed opposite a second light pipe 605. The light pipes may be formed of a solid light transmissive material. A light beam is generated by a light source 610 disposed within, for example, the base portion 110 of the clamshell phone 100 shown in FIGS. 1 and 2. The light beam travels into a first end 612 of the first light pipe 600. In the event that, for example, the light pipes shown in FIG. 6 are disposed within an electronic device such as the clamshell phone 100 shown in FIGS. 1 and 2, the first end 612 of the first light pipe 600 would extend in a direction transverse to the hinge axis of the clamshell phone 100. The light beam reflects off a reflective surface or portion 614 and is directed along the hinge axis or parallel to the hinge axis. The light beam passes through a second end 616 of the first light pipe 600. In this example, the second end 616 includes a first focusing lens 620 disposed thereon. The focusing lens 620 ensures that the light beam is traveling along the hinge axis. The light beam reaches a second focusing lens 625 disposed on a first end 630 of the second light pipe.

As shown, there is a gap between the first light pipe 600 and the second light pipe 605. In this configuration, this gap is permissible because the focusing lenses ensure that the light beam is traveling precisely along the hinge axis, alleviating a requirement that the light pipes be very close together.

Once the light beam reaches the first end 630 of the second light pipe 605, it continues traveling in a direction along the hinge axis until it reaches a second reflective surface 632 which reflects the light in a direction transverse to the hinge axis. In this example, the light is reflected down toward a second end 635 of the second light pipe 605 and then out of the second light pipe 605 where it is received by a light sensing element 615. It should be appreciated that in some other embodiments only a single focusing lens disposed on either the first light pipe 600 or the second light pipe 605 is utilized.

Figure 7:
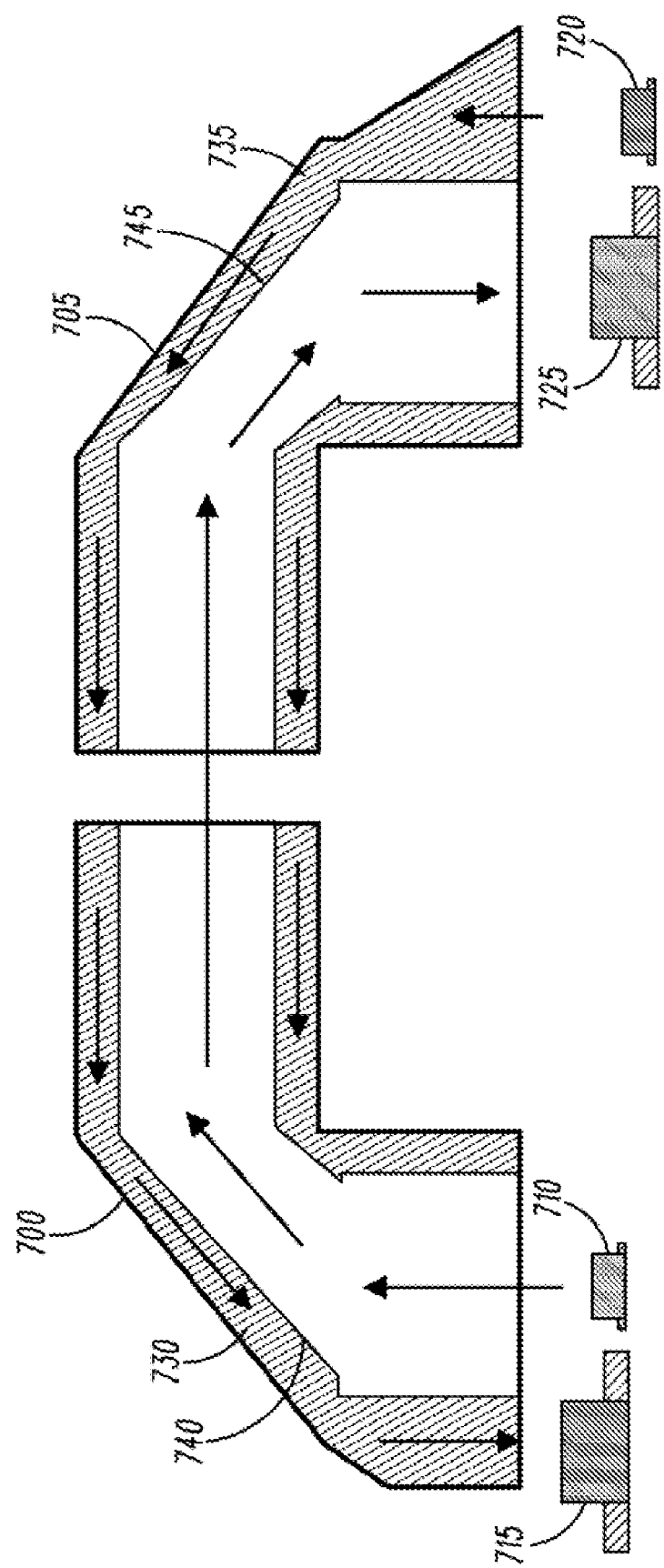
FIG. 7 illustrates an enlarged diagrammatic view of the light pipes having a hollow reflective center pathway for providing a first optical path and a outer walls for proving a second optical path.

FIG. 7 illustrates an enlarged diagrammatic view of light pipes having hollow reflective center pathway for providing a first optical path and outer walls for proving a second optical path. In this example, a first light pipe 700 and a second light pipe 705 are utilized and may be disposed within a clamshell phone such that the first light pipe 700 and the second light pipe 705 interface with each other within the hinge of the clamshell phone along the hinge axis. In the case of a bi-direction light pipe arrangement, the base portion may include the first light pipe 700 and the rotatable portion may include the second light pipe 705. Alternatively, the second light pipe 705 may be included within the base portion and the first light pipe 700 may be included within the rotatable portion of a clamshell phone.

A first light source 710 and a first light sensing element 715 are disposed within the base portion of the clamshell phone. A second light source 720 and a second light sensing element 725 are included within the rotatable portion of the clamshell phone. The first light pipe 700 and the second light pipe 705 are hollow and have walls 730 and 735, respectively, the outside of which are coated with a reflective material. The walls themselves are of a light transmissive material. The first light source 710 emits a first light beam that travels through the hollow center of the first light pipe 700 and then out and into the hollow center of the second light pipe 705. As shown, the light from the first light source 710 is reflected a couple times off the reflective walls. The light from the first light source 710 initially travels in a direction transverse to the hinge axis. The light subsequently reflects off of a reflective surface 740 and is directed along the hinge axis. The light beam passes out of the first light pipe 700 and into the second light pipe 705, continuing to travel along the hinge axis until it reaches a second reflective surface 745. The light beam reflects off the second reflective surface 745 in a direction transverse to the hinge axis and down the second light pipe until it exits and is sensed by the second light sensing element 725.

The walls of the light pipes are used for optical data transfer in the opposite direction. In this case, the second light source 720 provides a light beam to the light transmissive wall 735 of the second light pipe 705. The light beam is reflected several times within the wall 735 of the second light pipe 705 and after reflecting off of one or more surfaces, is directed out of the second light pipe in a direction parallel to the hinge axis toward the wall 730 of the first light pipe 700. The light is reflected one or more times off of reflective surfaces within the wall 730 of the first light pipe 700 until it is directed out of the wall 730 of the first light pipe in a direction transverse to the hinge axis and is received at the first light sensing element 715.

Accordingly, the embodiment shown in FIG. 7 provides bi-directional communication between the rotatable portion and the base portion. Although FIG. 7 shows one light path from base to the rotatable portion and another light path from the rotatable portion to the base portion, it should be appreciated that in some embodiments, both light paths may be in the same direction (i.e., from the base to the rotatable portion or from the rotatable portion to the base portion).

Figure 8:
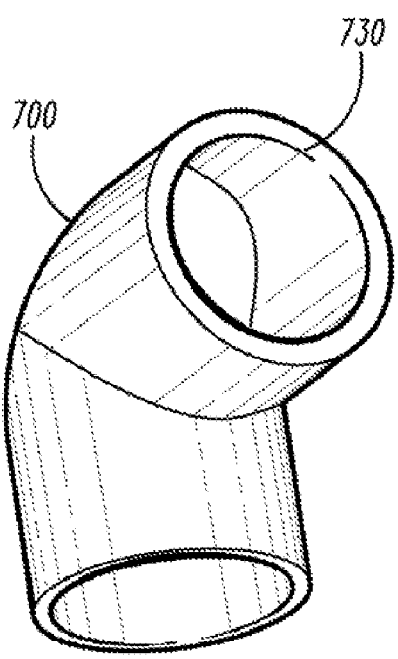
FIG. 8 illustrates an enlarged perspective view and FIG. 9 illustrates a cross-sectional view of the first light pipe having the hollow reflective center pathway shown in FIG. 7.
Figure 9:
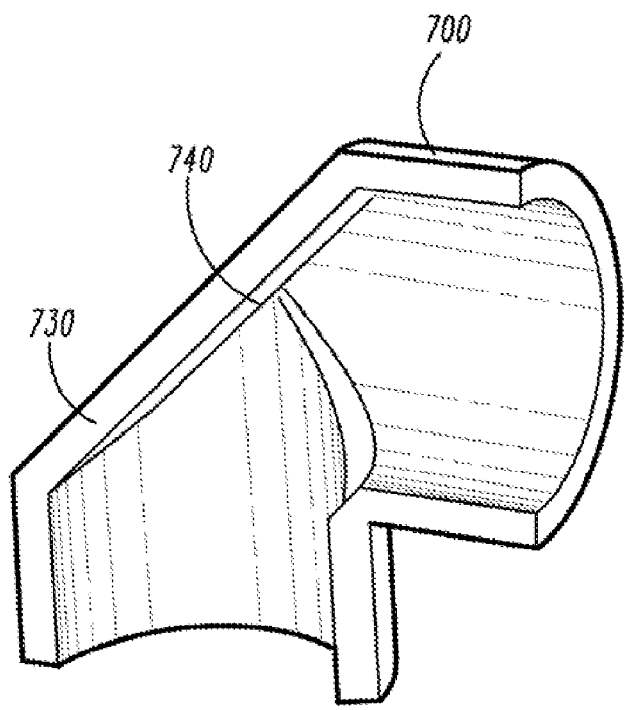

FIG. 8 illustrates an enlarged perspective view and FIG. 9 illustrates a cross-sectional view of the first light pipe 700 having the hollow reflective center pathway shown in FIG. 7. As shown, the first light pipe 700 includes the wall 730 that is coated with the reflective material and has the hollow pathway within its center. The reflective surfaces on the wall 730 are included to ensure that that light beam travels efficiently through the center of the first light pipe 700. It should be appreciated, however, that the faces, i.e., the ends, of the wall 730 of the light pipe 700 is not reflective to ensure that a light beam can pass through the wall 730 through either of the faces. As discussed above with respect to FIG. 7, the wall 730 itself is formed of a light transmissive material and may include reflective materials of its own at certain locations to guide a light beam traveling through the light transmissive material in the wall toward either the end of the first light pipe transverse to the hinge axis toward the other end of the light pipe that is parallel to the hinge axis, depending upon which direction the light beam is traveling (i.e., from the base portion to the rotatable portion or from the rotatable portion to the base portion).

According to various embodiments described above, a light transfer apparatus comprising a set of light pipes is provided for an electronic device such as a clamshell phone having a base portion and a rotatable portion that is to be pivotally opened and closed. The light pipes are aligned about a hinge axis within a hinge between the base portion and the rotatable portion.

The light pipes are aligned along the hinge axis and configured to maintain an optical alignment therebetween in the event that the electronic device is pivoted between open and closed positions. The base portion and the rotatable portion may exchange data and other information via the light pipes. During the opening/closing of the electronic device, the ends of the light pipes that lay along the hinge axis pivot relative to each other while maintaining this proper optical alignment, thereby providing an efficient and reliable means for the optical transmission of data between electronic components within the pivotal portions. The use of such light pipes avoids the high cost associated with fiber optics and the EM problems of current clamshell phones and provides for rapid optical data transfer.

The teachings discussed herein are applicable to other electronic devices utilizing pivotal portions where optical data is transferred between the pivotal portions, such as a portable notebook computer. Moreover, in some embodiments, a single set of light pipes is used to provide a bi-directional light path. For example, a first light beam may travel from the base portion to the rotatable portion via the center of the light pipes, whereas a second light beam may travel from the rotatable portion to the base portion via the outer walls of the light pipes.

A second set of light pipes may be provided on the opposite end of the hinge to provide the opposite optical path, i.e., from the rotatable portion to the base portion. In additional embodiments, a single set of light pipes is used to provide a bi-directional light path. For example, a first light beam may travel from the base portion to the rotatable portion via the center of the light pipes, whereas a second light beam may travel from the rotatable portion to the base portion via the outer walls of the light pipes.

By using separate light pipes to transfer optical data between the rotatable portion and the base portion, a reliable means of transferring such optical data is realized. The optical path is always properly aligned between the light pipe of the base portion and the light pipe of the rotatable portion. Use of such light pipes is less expensive and uses less physical space than current systems utilizing optical cables.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An electronic device comprising:
   a housing having pivotal portions and having a hinge defining a hinge axis between the pivotal portions about which the pivotal portions are pivotal;
   a light source associated with one of the pivotal portions and a light receiver associated with the other pivotal portion;
   a first substantially rigid light pipe mounted to the one pivotal portion and configured to receive light from the light source and direct light therefrom along the hinge axis;
   a second substantially rigid light pipe mounted to the other pivotal portion and configured to receive light from the first light pipe along the hinge axis and direct light therefrom to the light receiver; and
   a focusing lens formed integrally at an end of one of the rigid light pipes for focusing light traveling through the integral lens.

2. The electronic device of claim 1, wherein the light pipes are of a moldable light transmissive material.

3. The electronic device of claim 1, wherein each light pipe includes a portion extending along the hinge axis and another portion extending transversely thereto with a reflective surface therebetween.

4. The electronic device of claim 1, wherein the light receiver is located off the hinge axis, and the second light pipe has transverse portions and an internal reflective surface between the transmissive portions for redirecting light received along the hinge axis to the light receiver.

5. The electronic device of claim 1, wherein the light source is located off the hinge axis, and the first light pipe has transverse portions and an internal reflective surface between the transverse portions for redirecting light received from the light source to the second light pipe along the hinge axis.

6. The electronic device of claim 1, wherein the lens is disposed for focusing light traveling through the one light pipe.

7. The electronic device of claim 1, wherein the light pipes include facing ends along the hinge axis with the ends each having a lens configuration to allow for maximized spacing between the ends along the hinge axis.

8. The electronic device of claim 1, wherein the light pipes include a mating interface therebetween along the hinge axis.

9. An electronic device comprising:
   a housing having pivotal portions and having a hinge defining a hinge axis between the pivotal portions about which the pivotal portions are pivotal;
   a light source associated with one of the pivotal portions and a light receiver associated with the other pivotal portion;
   a first substantially rigid light pipe mounted to the one pivotal portion and configured to receive light from the light source and direct light therefrom along the hinge axis; and
   a second substantially rigid light pipe mounted to the other pivotal portion and configured to receive light from the first light pipe along the hinge axis and direct light therefrom to the light receiver;
   wherein a second light source associated with the other housing pivotal portion and a second light receiver is associated with the one housing pivotal portion, and the light pipes are configured to receive light from both light sources and transmit light to both light receivers in opposite directions to provide bi-directional light paths between the housing pivotal portions through the light pipes.

10. The electronic device of claim 9, wherein the light pipes each have a hollow configuration including a wall extending around a hollow interior with one of the light paths being through the hollow interiors of the light pipes and the other reversely directed light path being through the walls of the light pipes.

11. A wireless communication device, comprising:
    a base portion including a light source to generate light for transmitting data optically;
    a rotatable portion including a light receiver to receive the light;
    a hinge between the base portion and the rotatable portion about which the base and the rotatable portions are pivotal relative to each other and defining a hinge axis therebetween;
    a light transfer device having a first substantially rigid light pipe mounted to the base portion and configured to receive light from the light source and direct light therefrom along the hinge axis to a second substantially rigid light pipe mounted to the rotatable portion and configured to receive light from the first light pipe along the hinge axis and direct light therefrom to the light receiver;

a rigid end engagement portion of the first rigid light pipe oriented along the hinge axis; and a rigid end engagement portion of the second rigid light pipe oriented along the hinge axis in direct engagement with the first rigid light pipe end engagement portion so that there is no gap spacing between the rigid light pipes along the hinge axis.

12. The wireless communication device of claim 11, wherein the rotatable portion includes at least one of a camera and a display, and the base portion includes at least a processor for generating control data to optically transmit to the rotatable portion for controlling at least one of the camera and the display.

13. The wireless communication device of claim 11, wherein the light pipes include mating ends along the hinge axis.

14. A wireless communication device, comprising:

a base portion including a light source to generate light for transmitting data optically;

a rotatable portion including a light receiver to receive the light;

a hinge between the base portion and the rotatable portion about which the base and the rotatable portions are pivotal relative to each other and defining a hinge axis therebetween;

a light transfer device having a first substantially rigid light pipe mounted to the base portion and configured to receive light from the light source and direct light therefrom along the hinge axis to a second substantially rigid light pipe mounted to the rotatable portion and configured to receive light from the first light pipe along the hinge axis and direct light therefrom to the light receiver;

wherein the light pipes include mating ends along the hinge axis, and one of the mating ends has a reduced diameter plug configuration and the other mating end has a socket configuration an opening in which the plug end is received.

15. The wireless communication device of claim 11, wherein each light pipe includes a portion extending along the hinge axis and another portion extending transversely thereto with a reflective surface therebetween.

16. The wireless communication device of claim 11, wherein the light pipes are of a moldable light transmissive material.

17. A method of optically transferring data from a base portion to a rotatable portion of a housing having a hinge between the base portion and the rotatable portion about which the base and the rotatable portions are pivotal relative to each other and defining a hinge axis therebetween, comprising:

generating a light beam for optically transmitting the data from the base portion;

directing the light beam through a first substantially rigid light pipe so that the light beam travels transverse to the hinge axis and then parallel to or along the hinge axis;

receiving the light beam at an end of a second substantially rigid light pipe oriented along the hinge axis so that the light beam travels along the hinge axis and then in a direction transverse to the hinge axis;

focusing the light beam with a lens integrally formed with an end of one of the rigid light pipes oriented along the hinge axis; and receiving the light beam within the rotatable portion from the second substantially rigid light pipe.

18. The method of claim 17, further comprising optically transmitting the data from a processor within the base portion to a display within the rotatable portion via the light pipes.

19. The electronic device of claim 1 wherein the light pipes each have an end oriented along the hinge axis spaced from one another therealong, and the focusing lens comprises a pair of focusing lenses, one formed integrally on each light pipe end to keep light traveling along the hinge axis between the light pipe ends despite the spacing therebetween.

* * * * *